United States Patent [19]

Tschurbanoff

[11] Patent Number: 5,297,661

[45] Date of Patent: Mar. 29, 1994

[54] POWER SUPPLY MEANS FOR ELECTRICALLY OPERATED APPARATUSES AND A SWITCH FOR THE POWER SUPPLY MEANS

[75] Inventor: Aleksei Tschurbanoff, Turku, Finland

[73] Assignee: Tamrock Oy, Tampere, Finland

[21] Appl. No.: 945,973

[22] PCT Filed: May 9, 1991

[86] PCT No.: PCT/FI91/00145

§ 371 Date: Nov. 4, 1992

§ 102(e) Date: Nov. 4, 1992

[87] PCT Pub. No.: WO91/17905

PCT Pub. Date: Nov. 28, 1991

[30] Foreign Application Priority Data

May 18, 1990 [FI] Finland .................. 902467

[51] Int. Cl.$^5$ ............................. B60M 1/18
[52] U.S. Cl. ........................ 191/38; 104/99; 191/37; 246/419
[58] Field of Search ......... 104/35, 99; 191/12.2 R, 191/12.2 A, 23 A, 33 R, 36, 37, 38; 246/375, 377, 378, 415 R, 416, 417, 418, 419

[56] References Cited

U.S. PATENT DOCUMENTS

| | | | |
|---|---|---|---|
| 638,724 | 12/1899 | Knopp | 104/35 |
| 2,299,914 | 10/1942 | Matthes | 191/38 |
| 2,457,682 | 12/1948 | Kiser | 191/12.2 A X |
| 3,696,890 | 10/1972 | Armstrong | 104/99 X |
| 4,041,873 | 8/1977 | Jones | 104/99 X |
| 4,077,327 | 3/1978 | Ziegenfus et al. | 104/35 |
| 4,090,452 | 5/1978 | Segar | 104/247 |
| 4,207,821 | 6/1980 | Beckert | 104/119 |
| 4,532,385 | 7/1985 | Friske | 191/38 X |
| 4,700,023 | 10/1987 | Hillmann et al. | 191/12.2 A |
| 5,111,750 | 5/1992 | Nozaki et al. | 104/99 X |

FOREIGN PATENT DOCUMENTS

| | | | |
|---|---|---|---|
| 2309939 | 9/1974 | Fed. Rep. of Germany | 104/99 |
| 263390 | 12/1988 | Fed. Rep. of Germany . | |
| 81219 | 5/1990 | Finland . | |
| 943591 | 3/1949 | France . | |
| 0154302 | 9/1983 | Japan | 191/36 |
| 1498647 | 8/1989 | U.S.S.R. | 191/38 |

*Primary Examiner*—Michael S. Huppert
*Assistant Examiner*—Scott L. Lowe
*Attorney, Agent, or Firm*—Nixon & Vanderhye

[57] ABSTRACT

A trolley-type power supply means and a turntable switch for moving apparatuses such as mining equipment. The switch is provided with two coupling portions installed in parallel with each other and reversely symmetrical with respect to a turning axis. By using coupling portions, a trolley can be turned in a desired direction or shunted from the trolley track to allow another trolley to pass by.

6 Claims, 10 Drawing Sheets

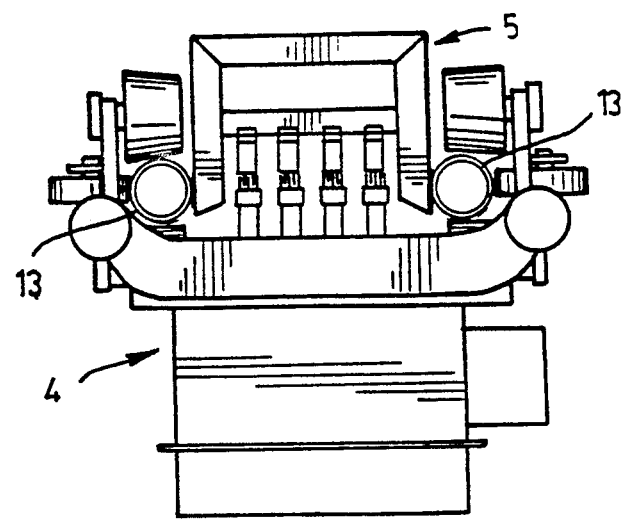
FIG. 5
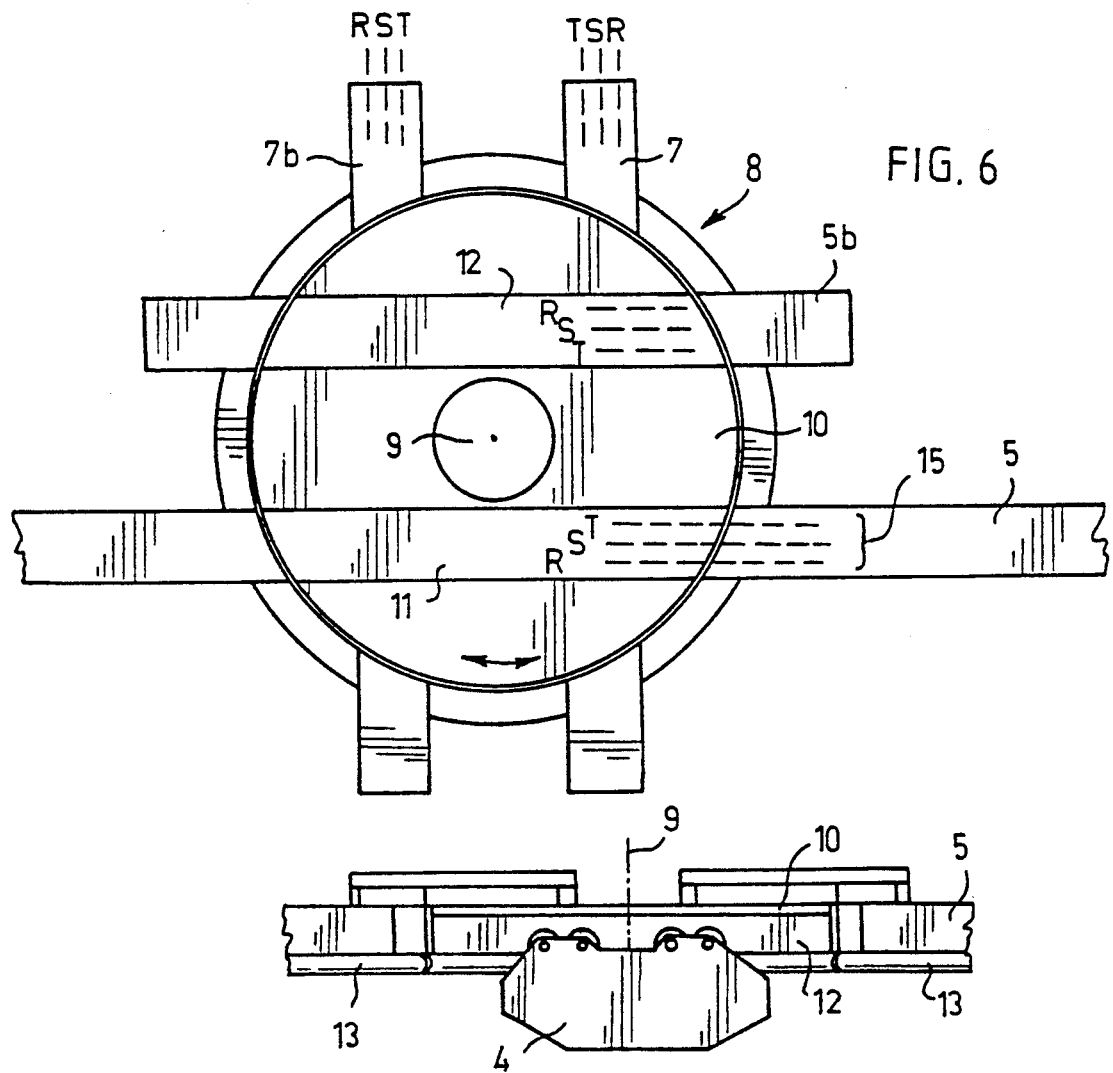
FIG. 6
FIG. 7

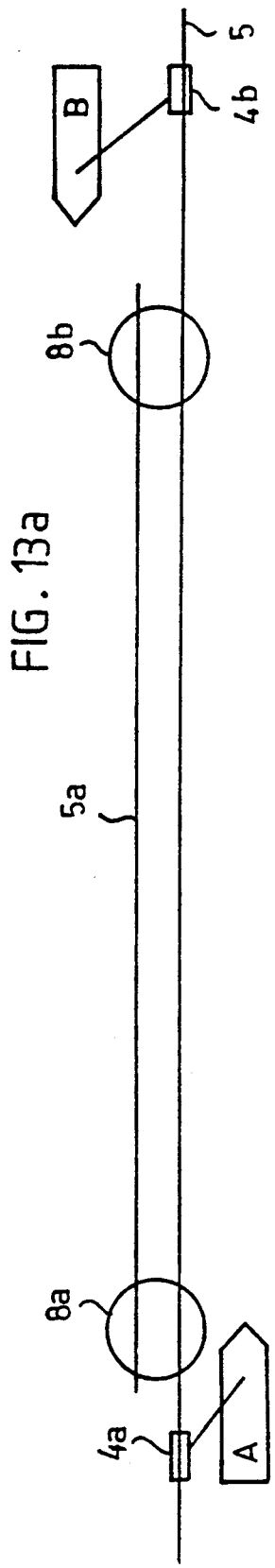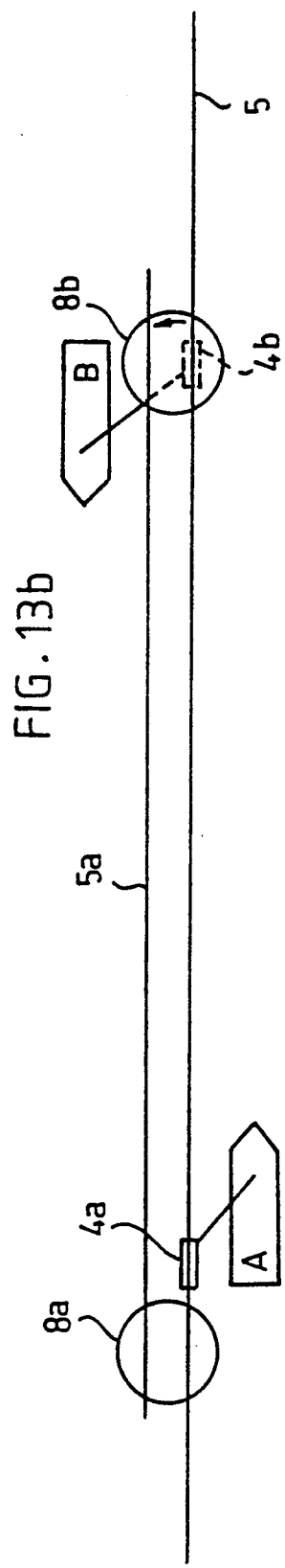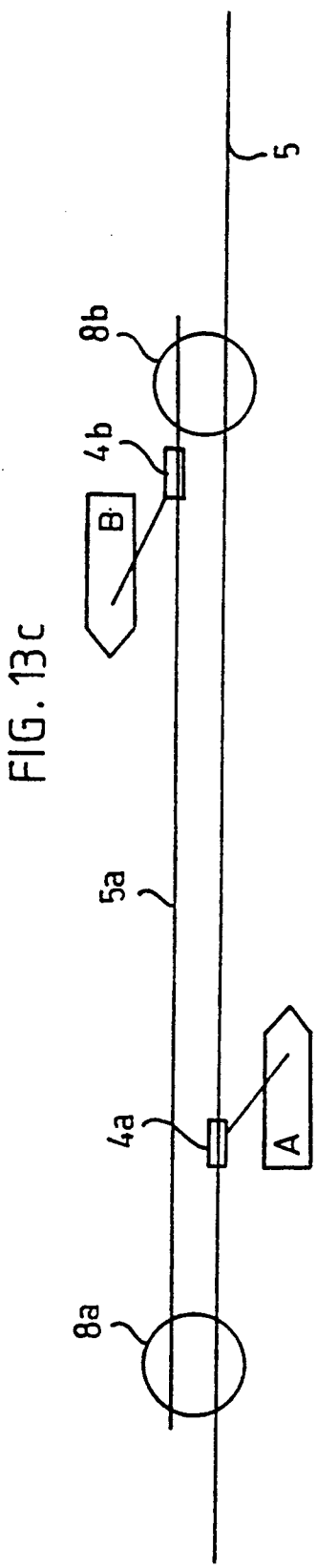

POWER SUPPLY MEANS FOR ELECTRICALLY OPERATED APPARATUSES AND A SWITCH FOR THE POWER SUPPLY MEANS

BACKGROUND AND SUMMARY OF THE INVENTION

The invention relates to a power supply means for electrically operated moving apparatuses such as mining equipment, comprising a trolley track comprising busbars and positioned at least over a portion of its length above a space where the apparatuses move;

trolleys movable on the trolley track, the trolleys comprising contacts arranged in contact with the busbars and each being connected to the respective apparatus by means of an electric cable with adjustable length; and at least one turntable-type switch installed in the trolley track above the space where the apparatuses move and comprising a coupling portion forming part of the trolley track, whereby, when extending in the same direction as the trolley track in alignment with it, the coupling portion forms together with the trolley track a continuous trolley track along which the trolley is movable and which is pivotable about a vertical axis away from the trolley track to another position, whereby the trolley is turnable by means of the switch to another position together with the coupling portion when it reaches the switch.

The invention is also concerned with a turntable-type switch for a power supply means intended for electrically operated moving apparatuses, the power supply means comprising a trolley track comprising busbars and positioned at least over a portion of its length above a space where the apparatuses move;

trolleys movable on the trolley track, the trolleys comprising contacts arranged in contact with the busbars and each being connected to the respective apparatus by means of an electric cable with adjustable length; the switch comprising a coupling portion forming part of the trolley track, whereby, when extending in the same direction as the trolley track in alignment with it, the coupling portion forms together with the trolley track a continuous trolley track along which the trolley is movable and which is pivotable about a vertical axis away from the trolley track to another position, whereby the trolley is turnable by means of the switch to another position together with the coupling portion when it reaches the switch.

In a trolley system intended for the power supply of various vehicles and machines, electric current is applied to the point of application from busbars positioned in a trolley track in the ceiling of a space where the vehicles or machine move. In addition to busbars, the trolley system comprises a roller race on which a trolley supporting slide contacts in contact with the busbars is movable. From the trolley a cable leads to the apparatus utilizing the current. When the apparatus moves on, the trolley slides along its roller race while the slide contacts make contact with the busbars, thus conducting current to the apparatus through the cable.

Various conditions require trolley track structures and switches of different types, in order that several apparatuses could utilize the same trolley track. It is a fairly common practice to use a single trolley track comprising required busbars, switches being installed at junctions for shunting the trolley to an intersecting trolley track. When, for instance, the track is branched or there are several moving apparatuses, it is necessary to provide switches and in some cases a shunting track of sufficient length for trolleys moving in opposite directions. Trolley switches known in the prior art include a bending switch, a guillotine switch to be displaced aside and a turntable switch.

In the bending switch, the switching is carried out by bending a portion of the trolley track to an other position; this kind of switch is today fairly common in mining use. The arrangement is simple and reliable in operation, but it has many disadvantages. Strains caused by the bending weaken the structure in the long run, which involves a safety risk. Furthermore, rather a long portion of the track, typically 7 to 8 meters, has to be bent to achieve the required sideward displacement, wherefore the switch is unreasonably long in practice. The length of the busbars changes on bending, which causes installation problems. Moreover, in cases where a shunting place has to be provided, the required construction, comprising two switches and an additional track, is more than 20 meters in length, which is difficult to realize and expensive to construct. When using the bending switch, it is not possible to construct a turning loop at the end of the trolley track, because the turning loop would reverse the phase sequence of the busbars.

The guillotine switch comprises a coupling portion movable in the transverse direction of the trolley track. The coupling portion comprises a straight and a curved track portion side by side. Switching takes place by displacing the coupling portion, so that either one of the track portions will form an extension of the main track, depending on the position of the coupling portion. In principle, this arrangement is also simple but has a number of disadvantages. The structure is difficult to realize and unreliable in operation. At various junctions and shunting places, the installation and operation of this arrangement are difficult if not impossible because, for instance, it cannot be used with intersecting tracks. With this switch structure, the end of the track cannot be formed into a loop as the phase sequence of the busbars would be reversed. The structure is difficult to modify and additional bends are formed in the track when the structure is used.

The turntable switch comprises a pivotal turntable to which a straight track portion is attached. Switching takes place by revolving the turntable so that the track portion forms an extension of the desired track. This switch is reliable in operation and takes up little space, in addition to which it can be realized in a simple manner. A disadvantage is, however, that the end of the track cannot be formed into a loop, as the loop would reverse the phase sequence of the busbars. The structure is also difficult to modify and in certain cases it causes additional bends in the track. This switch cannot, either, be used as a shunting switch as only one trolley at a time can be positioned on the track portion of the switch.

The object of the present invention is to provide a power supply means and a switch by means of which various track arrangements are easy and simple to realize and by means of which the end of a trolley track can be formed into a loop so that the apparatus to be supplied with power can perform a turning movement and return easily and simply and in which the switch may simultaneously operate as a shunting switch without unnecessarily retarding meeting apparatuses or causing them to stop.

The power supply means of the invention is characterized in that the switch comprises two parallel coupling portions positioned reversely symmetrically with respect to the turning axis of the turntable;

the phase sequence of the busbars of the coupling portions is correspondingly reversely symmetrical with respect to the turning axis;

the coupling portions are so spaced apart from each other that a trolley can be positioned simultaneously on both coupling portions: and both coupling portions of the switch are turnable in alignment with the rest of the trolley track so as to form a continuous trolley track.

The switch of the invention is characterized in that the switch comprises two parallel coupling portions positioned reversely symmetrically with respect to the turning axis of the turntable;

the phase sequence of the busbars of the coupling portions is correspondingly reversely symmetrical with respect to the turning axis;

the coupling portions are so spaced apart from each other that a trolley can be positioned simultaneously on both coupling portions; and both coupling portions of the switch are turnable in alignment with the rest of the trolley track so as to form a continuous trolley track.

The basic idea of the invention is that the switch is a turntable-type switch comprising two coupling portions positioned reversely symmetrically with respect to the turning centre in such a way that the phase sequence of the busbars is correspondingly reversely symmetrical. When two apparatuses meet each other, the switch is turned after the trolley of one apparatus has reached the switch so that the trolley is shunted from the main track and the trolley of the other apparatus is able to drive through the switch without stopping, whereafter the first trolley is shunted back to the main track, and it can move on. Correspondingly, the switch can be installed in connection with the end loop of the trolley track. After the trolley has moved around the loop, it is shunted back to the main trolley track and the voltage phases of the busbars and, as a consequence, those of the trolley remain unchanged.

BRIEF DESCRIPTION OF THE DRAWING FIGURES

The invention will be described in greater detail in the attached drawings, in which FIG. 1 illustrates schematically a conventional trolley apparatus and a trolley track with a trolley moving on it;

FIG. 5 shows the trolley when attached to the trolley track;

FIG. 6 is a schematic bottom view of the switch of the invention;

FIG. 7 is a schematic side view of the switch shown in FIG. 6;

FIGS. 13a to 13c illustrate schematically the operation of a shunting track application intended to be used simultaneously by several apparatuses.

DESCRIPTION OF A PREFERRED EMBODIMENT

Figure 1:
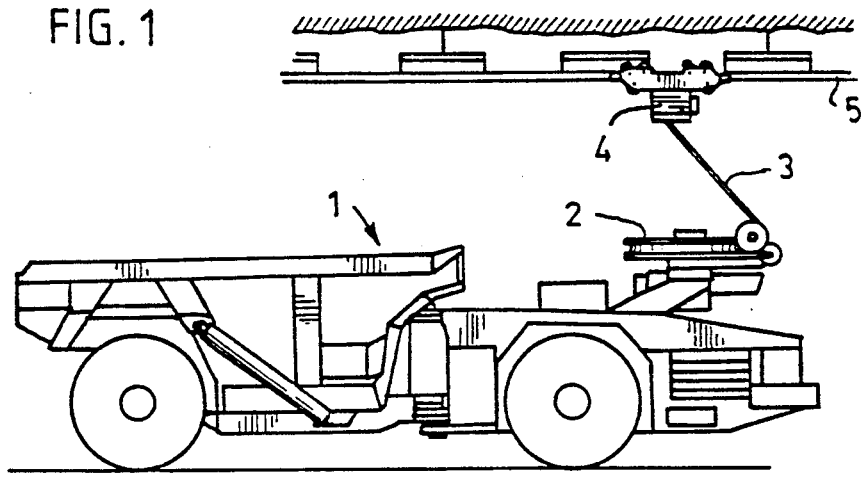

FIG. 1 shows a dumper 1 upon which a cable reel 2 is positioned. From the cable reel 2 a cable 3 leads to a trolley 4 movable along a trolley track 5 installed in the ceiling of a tunnel or cave. The dumper is a typical example of an apparatus utilizing the trolley system but any other mining equipment or other similar equipment can be connected to the trolley system for the supply of operating power.

Figure 2:
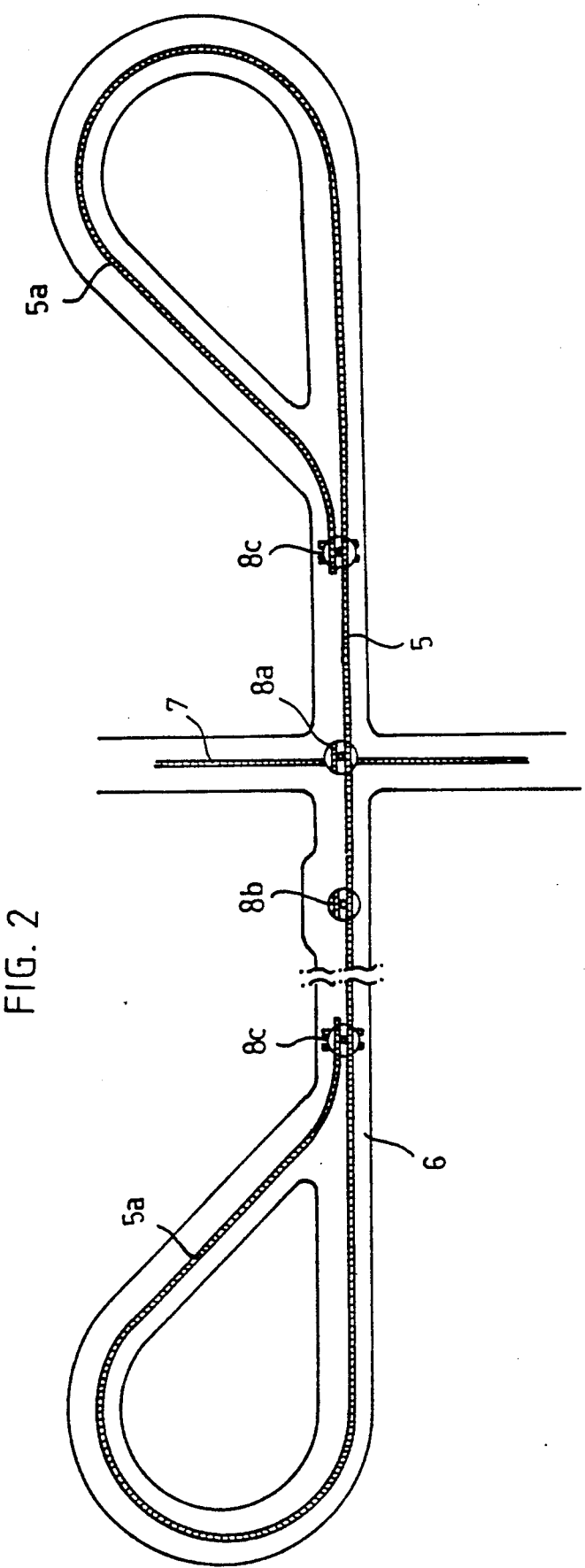
FIG. 2 illustrates schematically a portion of the trolley track embodying the invention.

FIG. 2 shows schematically a portion of the trolley track applying the invention. In the figure, the trolley track 5 runs along a tunnel 6, being installed in a typical manner known per se to the ceiling of the tunnel or to supports suspended from the ceiling. The trolley track 5 may also be partly installed on the wall if permitted by prevailing conditions or structural features of the tunnel. Another trolley track 7 intersects the trolley track 5, and a switch 8a is positioned at the junction of the tracks. The trolley track 5 further comprises a second switch 8b within its straight portion at the shunting point. Further, a third switch 8c is provided at the junction point of a loop 5a at the end of the trolley track 5 for returning the trolley to the trolley track 5 after it has moved around the loop. In principle, the switches 8a, 8b and 8c are substantially similar in operation and structure, and their structure is shown schematically in FIGS. 6 and 7. In mining conditions, when the apparatuses move in tunnels, it is self-evident that any unnecessary excavation is avoided, so that the width of the tunnels is sufficient for one vehicle only. Therefore shunting places are excavated in the tunnels at intervals such that an estimated number of vehicles or apparatuses required for each particular project are able to move without having to wait unreasonably long at any stage. When two vehicles or apparatuses meet each other, it is typical that one of the vehicles or apparatuses stops at the shunting place to allow the other vehicle or apparatus to pass by, whereafter it moves on.

Figure 3:
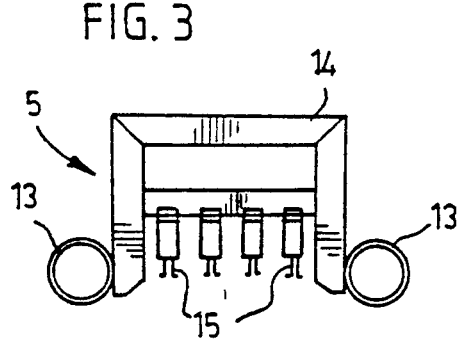
FIG. 3 is a schematic cross-sectional view of the trolley track.

FIG. 3 is a schematic cross-sectional view of the trolley track 5, which comprises round tubular roller races 13 for the trolley, an interconnecting support member 14 being positioned between the roller races. Phase and zero rails or busbars 15 through which current is supplied to the trolley 4 are provided between the roller races 13 and secured to the support member 14. The structure and installation of the busbars are known per se and obvious to one skilled in the art, so they will not be discussed more closely herein.

Figure 4A:
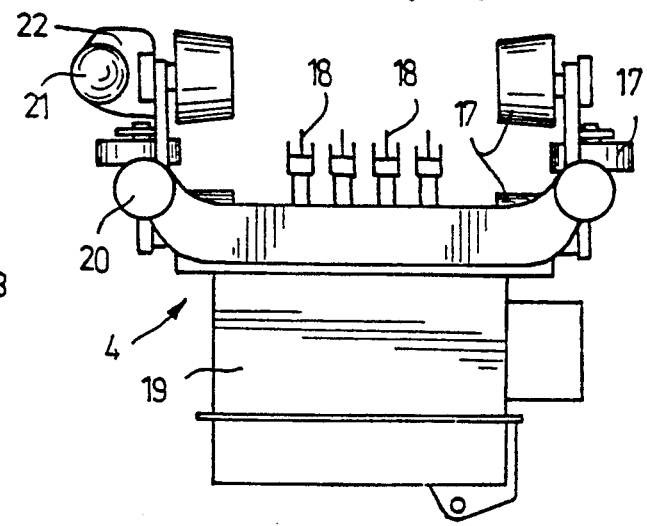
FIGS. 4a and 4b illustrate schematically the trolley.
Figure 4B:
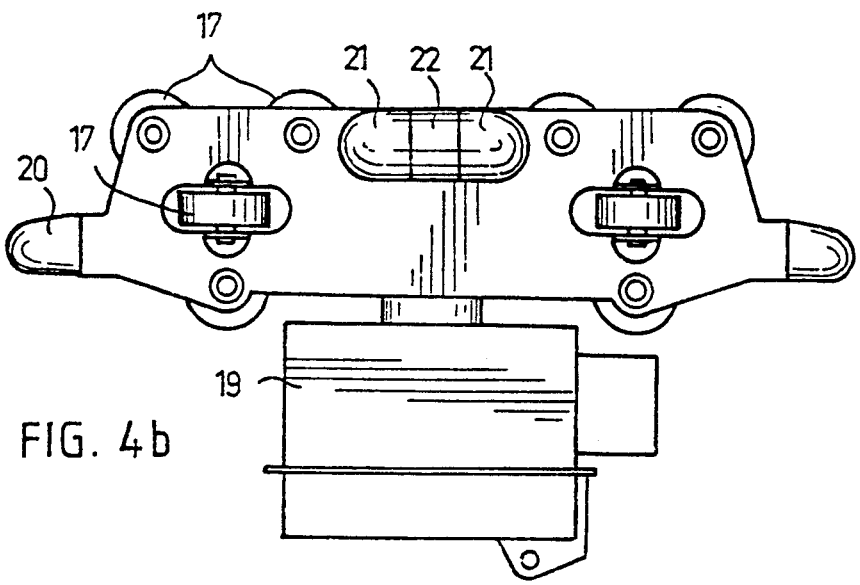

FIGS. 4a and 4b show the trolley 4 schematically in the transverse direction of the track and in the longitudinal direction, respectively. The trolley 4 comprises a body on both sides of which wheel sets 17 are attached so that they will be positioned on both sides of the roller races 13 of the trolley track. The trolley further comprises contacts or slide contacts 18 which are in contact with the busbars 15 when the trolley 4 has been installed in the trolley track. The contacts 18 are further connected through a connection unit 19 provided in the trolley to the cable 3, through which current is conducted to the apparatus to be supplied with power. The structure and operation of the contacts 18 and the connection of the cable to the contacts and other techniques associated with the operation and structure of the trolley are obvious to one skilled in the art and will not be described more closely herein. The trolley 4 is further provided at its both ends with resilient members 20 to soften and damp the impact of collision to other trolleys or to the barrier at the end of the roller race. Furthermore, the trolley 4 is provided at its one side with a locking part 22 provided with resilient damping means 21. The movement of the trolley 4 is braked by the locking part 22 when it approaches the switch, in addition to which the locking part is utilized for locking the trolley 4 in place at the switch.

FIG. 5 shows the trolley 4 when installed in the trolley track 5. As appears from the figure, the tubular roller races 13 are positioned between the wheels of the wheel sets 17 while the contacts 18 are in contact with the phase and zero rails.

FIG. 6 shows a switch 8 comprising a turntable 10 rotating about a central axis 9. The turntable 10 is provided with two coupling portions 11 and 12. The coupling portions 11 and 12 are so shaped that they are reversely symmetrical with respect to the axis 9; correspondingly, the order of their separate busbars is similarly reversely symmetrical so that the order of the busbars is always the same in a direction away from the axis 9 towards the edge of the turntable 10. Trolley tracks 5 are positioned outside the turntable, and there can be one or two trolley tracks side by side in parallel, and correspondingly one or two tracks side by side in a crosswise direction with respect to the former ones. The figure shows a trolley track 5 and connection facilities parallel with it for another trolley track 5b or for a turning loop formed at the end of the track 5. Further, the switch comprises connection facilities for an intersecting trolley track 7 and for a possible second trolley track 7b parallel with it. These connections are not necessary in all embodiments, so they can be omitted if desired. However, if such track directions are possible at the place where the switch is positioned, it is preferable to premount them in the switch. The switch thereby has a wide range of applications. Correspondingly, the coupling portions 11 and 12 and the end portions of the trolley tracks 5 are so shaped that, if required, the trolley 4 can pass through the switch without stopping when the coupling portions 11 and 12 are in parallel with one particular trolley track or trolley tracks 5. The figure further shows schematically the busbars 15 with three phases, the three phases being indicated with the generally used references R, S and T, and one possible location of the busbars 15 is indicated schematically by broken lines in the coupling portions 11 and 12, the track 5 and the intersecting track coupling portions 7 and 7b. As appears from the figure, the phases of the busbars in the track portions 11 and 12 are reversely symmetrical with respect to the axis 9 so that, in the case shown in the figure, the busbar of the phase R has the outermost position, the busbar of the phase T has the innermost position and the busbar of the phase S has the middle position. If the turntable 10 is turned through 180° about the axis 9, the coupling portions 11 and 12 change places, but the phases of the busbars in them are in the same order as those of the other coupling portion before the turning. Correspondingly, the busbars of the track coupling portions 7 and 7b are positioned reversely symmetrically with respect to each other, so that the phases of the busbars of the end loop at the possible end loop junction change in a known manner. Correspondingly, if two parallel trolley tracks are constructed, their phase sequences have to be reversed with respect to each other.

FIG. 7 shows the switch of FIG. 6 from the side when the trolley 4 is within the area of the switch. The turntable 10 of the switch is mounted rotatably about the axis 9. In the figure, the roller races 13 of the coupling portion 11 attached to the turntable 10 and, correspondingly, its busbars 15 are in line with the roller races 13 and the busbars 15 of the trolley track 5. In this situation, the trolley 4 is supported by the coupling portion 11 of the turntable 10, and by rotating the turntable 10, it can be turned either to an intersecting trolley track or it can be shunted from the trolley track while the other coupling portion 12 attached to the turntable 10 turns, in the latter case, and forms an extension of the trolley track 5, thus allowing another trolley 4 to pass through the switch.

Figure 8:
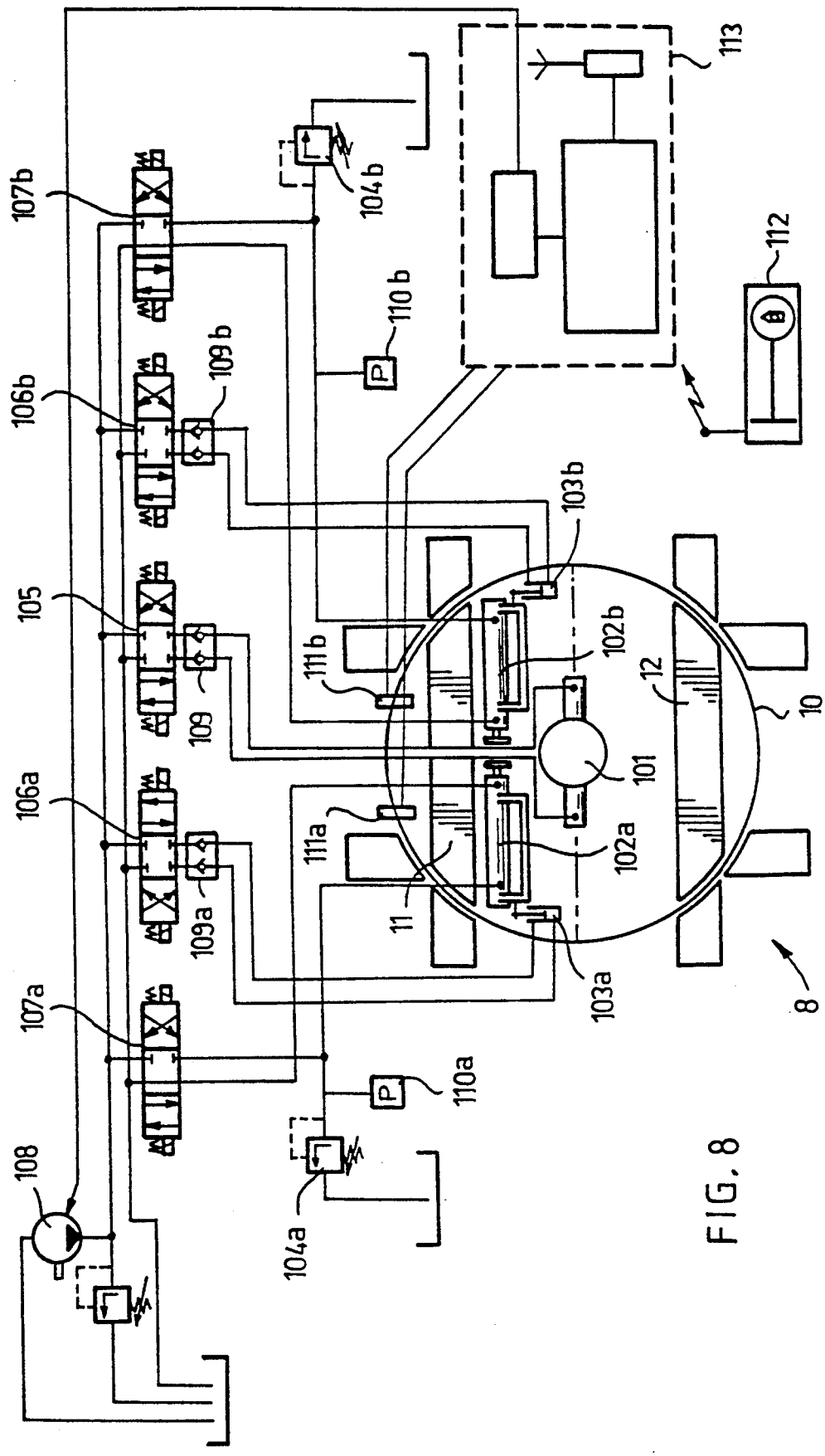
FIG. 8 shows a wiring diagram for the switch of the invention.

FIG. 8 shows schematically a hydraulic arrangement suitable for the switch of the invention. The figure shows a switch 8 comprising coupling portions 11 and 12 attached to a turntable 10. It further comprises a rotation motor or rotation mechanism 101 by means of which the turntable 10 is pivoted into different positions. The coupling portion 11 of the turntable 10 is provided on one side with braking and locking means comprising braking cylinders 102a and 102b and turning cylinders 103a and 103b. From the braking cylinders 102a and 102b, pressure conduits lead from behind the pistons into a pressure fluid tank, the conduits being provided with braking valves 104a and 104b which allow the pressure fluid to flow from the braking cylinders 102a and 102b into the pressure fluid tank when the pressure exceeds a predetermined value. The equipment further comprises an operating valve 105 for the rotation mechanism 101, turning valves 106a and 106b for the turning cylinders 103a and 103b and operating valves 107a and 107b for the braking cylinders. In addition, the equipment comprises a pressure fluid pump 108 and pressure-controlled non-return valves 109, 109a and 109b connected in series with the operating valve 105 of the rotation mechanism and the turning valves 106a and 106b of the turning cylinders 103a and 103b of the braking and locking means. The non-return valves 109, 109a and 109b prevent the flow of pressure fluid from the rotation machinery 101 and from the turning cylinders 103a and 103b, respectively, locking them in position when no pressure fluid is applied to them through any one of the conduits. Pressure conduits lead from the front side of the braking piston of the cylinders 102a and 102b to the operating valves 107a and 107b, whereby the operating valves enable the pistons of the braking cylinders 102a and 102b to be extracted from the cylinder or withdrawn into the cylinder. Furthermore, the equipment comprises pressure switches 110a and 110b which indicate the pressure of the pressure fluid contained in the discharge conduits of the braking cylinders 102a and 102b, and limit switches 111a and 111b which indicate whether the position of the trolley 4 is appropriate for locking. The equipment also comprises a remote control 112 in each apparatus, a receiver connected to the operating means of the switch 8, and a control unit 113 arranged to control the operating valves and the pressure fluid pump for operating the switch. The operation of the equipment is described schematically in FIGS. 9a-9f and in FIGS. 10a-10c. Being obvious to one skilled in the art, component structures, valve operation and drift, and hydraulic connections between the valves and the cylinders will not be described in more detail.

Figure 9A:
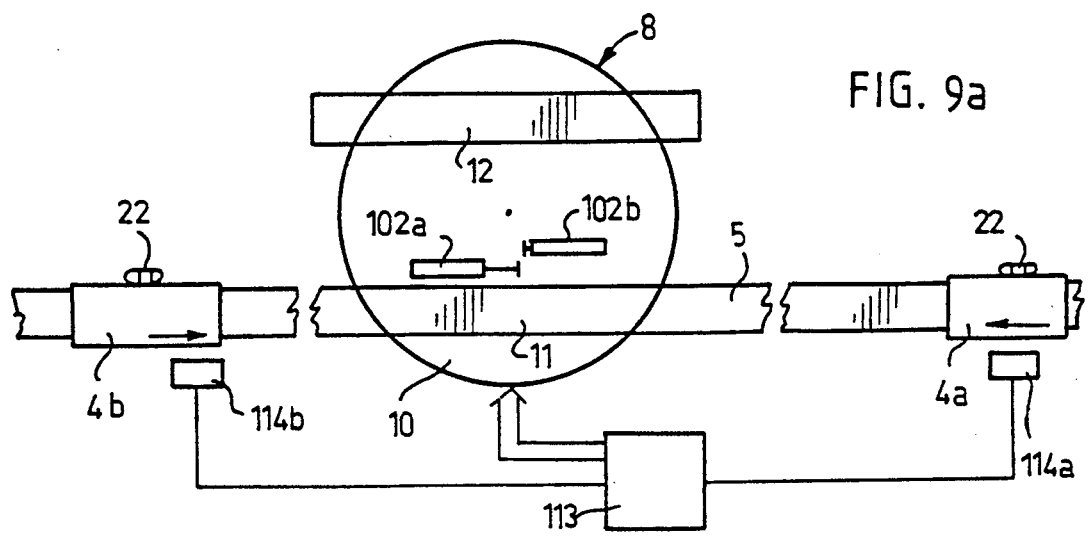
FIGS. 9a to 9f illustrate schematically the operation of the switch of the invention as a shunting switch.
Figure 9B:
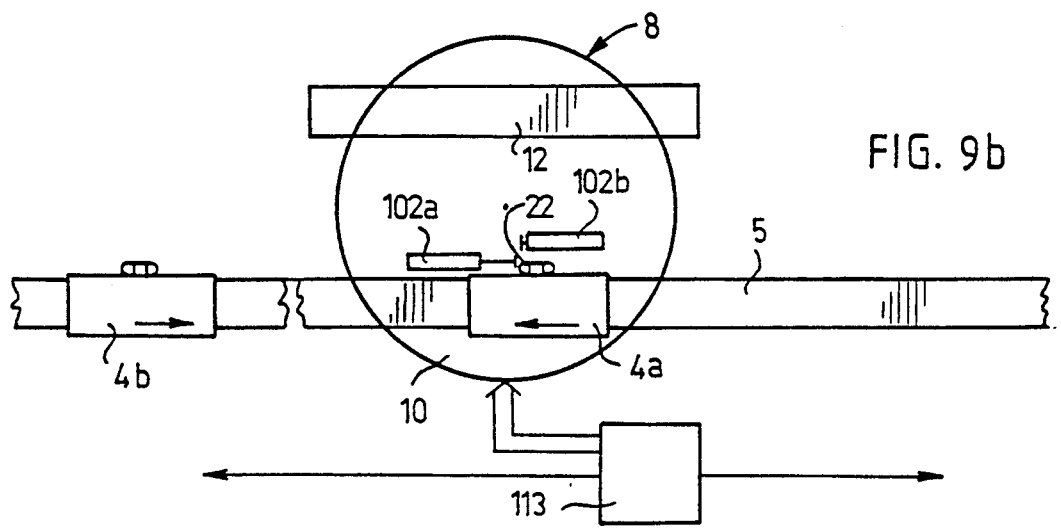
Figure 9C:
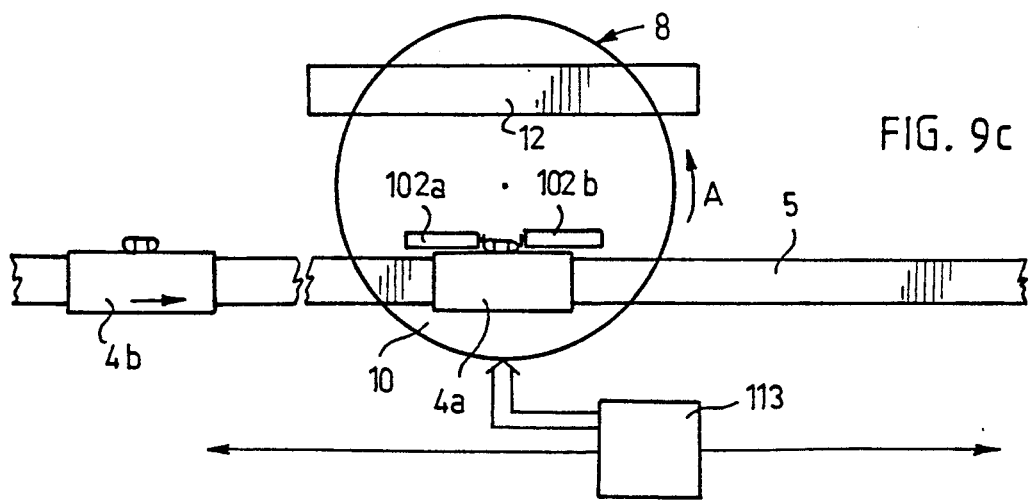
Figure 9D:
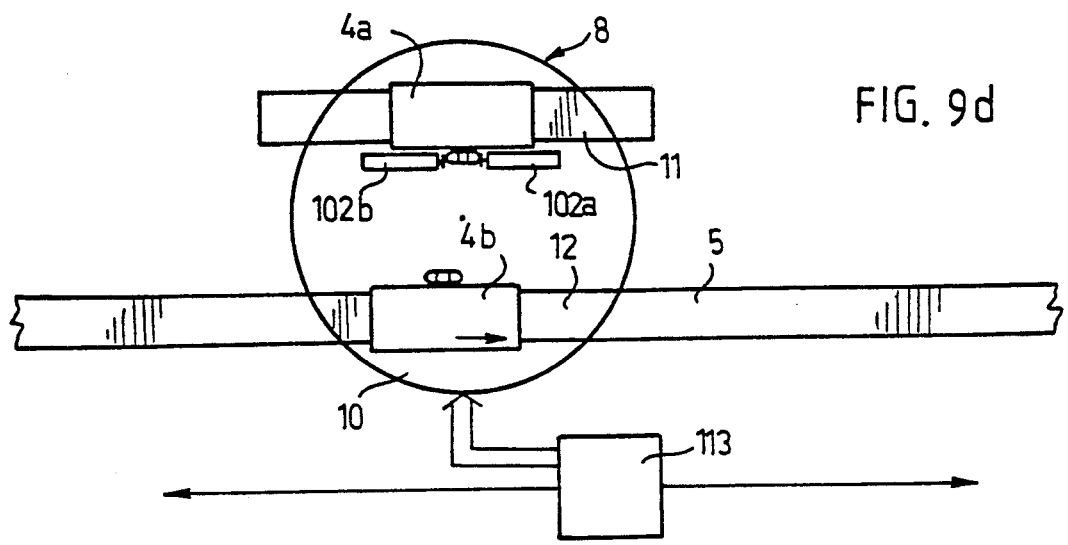
Figure 9E:
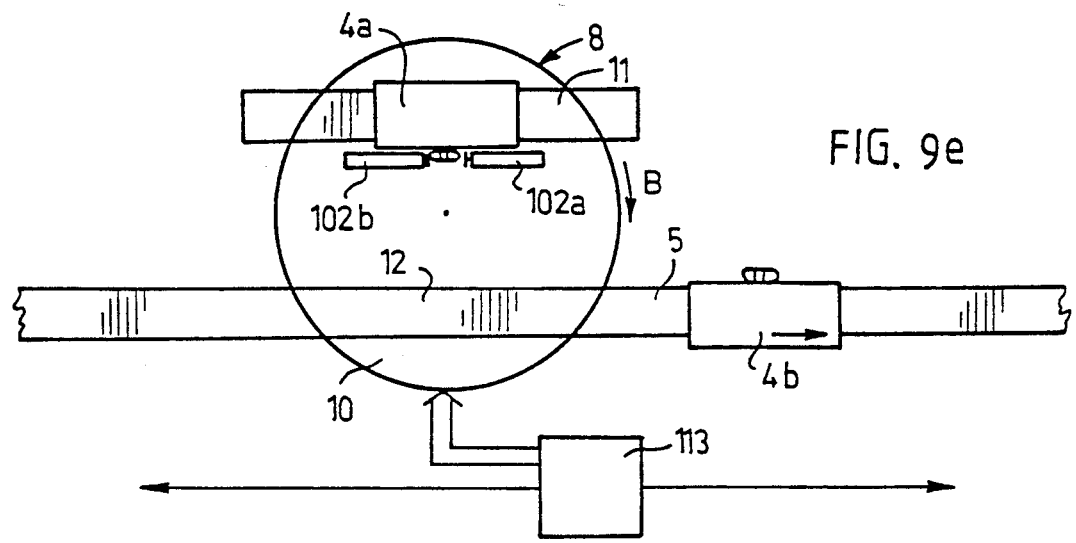
Figure 9F:
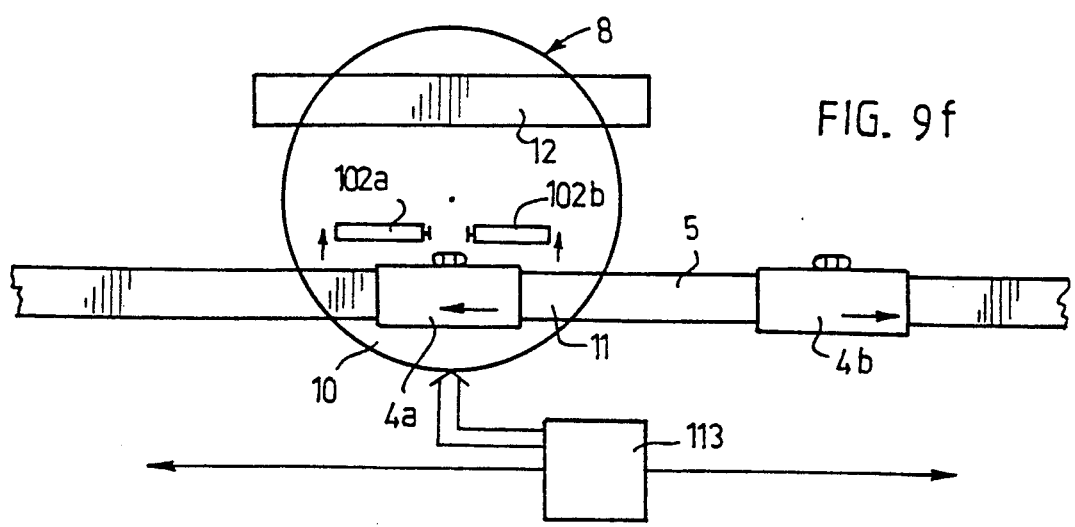

FIG. 9a shows schematically how a trolley 4a approaches the switch 8 while another trolley 4b approaches the switch 8 in the opposite direction along the same trolley track 5. It is assumed that the apparatus connected to the trolley 4a is bound to give way, which is indicated by the driver by means of the remote control 112, for instance. An approach indicator 114a thereby informs the control unit 113 that the trolley 4a has to be stopped at the switch and shunted from the trolley track 5. The control unit 113 controls the operating valves 106a, 106b and 107a, 107b of the coupling arrangement of FIG. 8 in such a way that the braking cylinder 102a, the piston rod of which points towards the trolley 4a, turns down close to the trolley track 5; correspondingly, the braking cylinder 102a, the piston rod of which points in the other direction, turns away from the trolley track 5. At the same time the operating valves 107a and 107b control the piston rods of the braking cylinders 102a and 102b in such a way that the piston rod of the cylinder 102a pointing towards the trolley 4a is fully extracted and the piston rod of the cylinder 102b is fully withdrawn. Thereafter the valves are otherwise set to the position shown in FIG. 8 to wait for the arrival of the trolley 4a. When the trolley 4a reaches the switch 8, its locking means 22 strikes the piston rod of the cylinder 102a and pushes it, as shown in FIG. 9b, inwards under the influence of its speed and mass, so that the pressure created in the cylinder 102a opens the valve 104a and the pressure fluid flows from the cylinder 102a into the pressure fluid tank while the piston rod constantly moves inwards, thus slowing down the movement of the trolley 4a until it stops. Thereafter the control unit 113 checks by means of the pressure switch 110a and the limit switch 111a that pressure in the conduit is zero and the trolley 4a has stopped at the right place and, if required, draws the piston rod of the cylinder 102a fully within the cylinder 102a by means of the valve 107a. Thereafter the braking cylinder 102b, the piston rod of which is fully withdrawn, is turned down so that the braking and locking means 22 of the trolley 4a remain between the piston rods of the cylinders 102a and 102b, being thus locked in position, as shown in FIG. 9c. When the trolley 4a has been locked in position, the turntable 10 is turned through 180°, so that the trolley 4a is shunted from the trolley track 5 and the coupling portion 12 turns in alignment with the trolley track 5, as shown in FIG. 9d. The trolley 4b is thereby able to pass through the switch 8 without slowing down, so that the apparatus or vehicle connected to it can freely go past the switch, as shown in FIG. 9e. After the trolley 4a has passed through the switch, the turntable 10 can again be turned back through 180°, so that the trolley 4a is again positioned at the trolley track 5, as shown in FIG. 9f. Thereafrer both braking cylinders 102a and 102b are turned outwards from the trolley track 5, so that the locking means 22 of the trolley 4a is released as shown in FIG. 9f and the trolley 4a is able to move on along the trolley track 5.

Figure 10A:
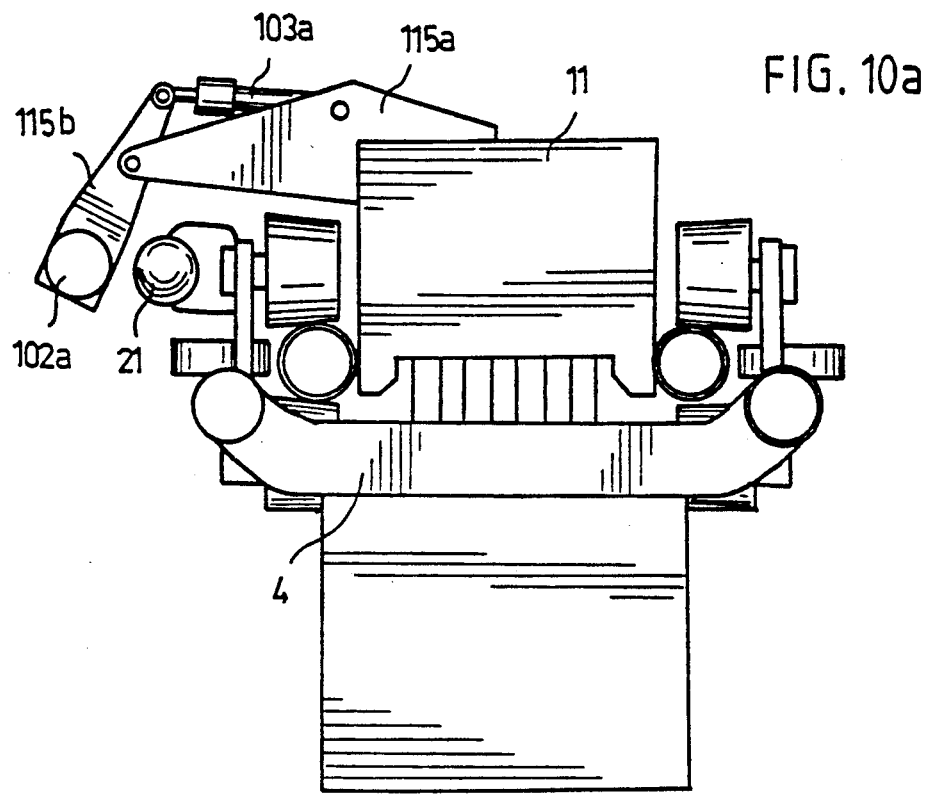
FIGS. 10a to 10b illustrate one embodiment of a braking and locking device 102 and its operation.
Figure 10B:
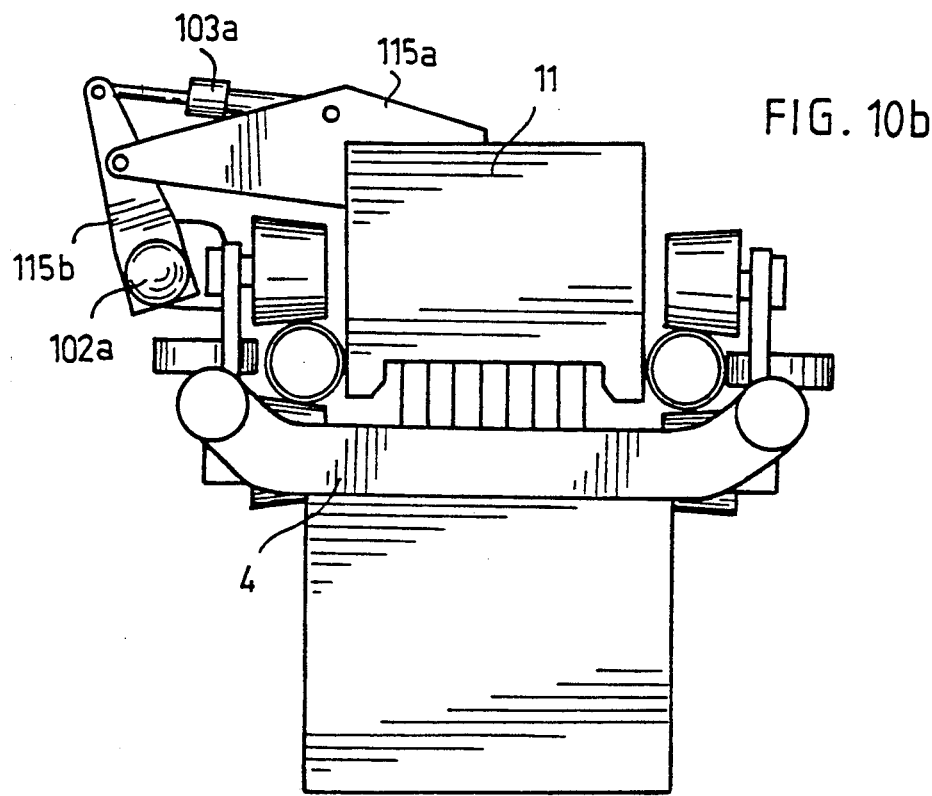

FIG. 10a shows schematically the braking cylinder 102a and its installation in the coupling portion of the switch 8. The braking cylinder 102a is installed in a track portion formed by the coupling portion 11 of the switch 8 by means of a support frame 115a and a pivot arm 115b. The support frame 115a is attached, e.g., to the coupling portion 11 in a direction transverse to it, and the pivot arm 115b is journalled to the support frame pivotably around the longitudinal axis of the coupling portion 11. The turning cylinder 103a is installed by means of the support frame 115a and the pivot arm 115b in such a way that it can be turned with respect to the support frame 115a by extending or shortening the pivot arm 115b; correspondingly, the cylinder 102a can be displaced close to the coupling portion or outwards from it, depending on whether or not the cylinder is needed for braking or locking. In FIG. 10a, the braking cylinder 102a has been turned outwards from the coupling portion 11 in order that the trolley 4 could pass by it. In FIG. 10b, the braking cylinder 102a is in the braking or locking position close to the coupling portion 11.

Figure 11A:
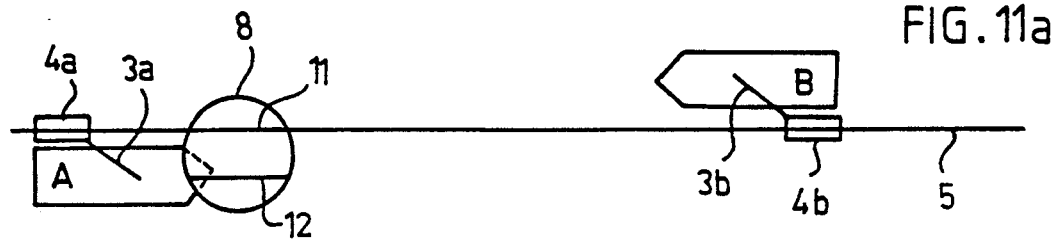
FIGS. 11a to 11e illustrate schematically the operation of the switch when two apparatuses meet each other.
Figure 11B:
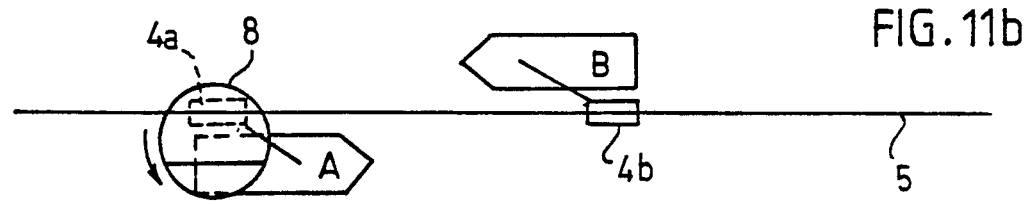
Figure 11C:
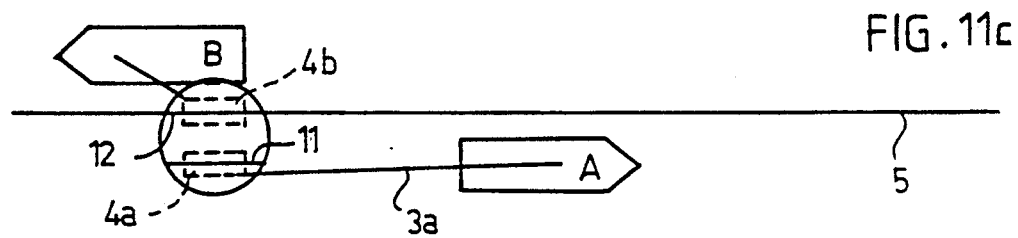
Figure 11D:
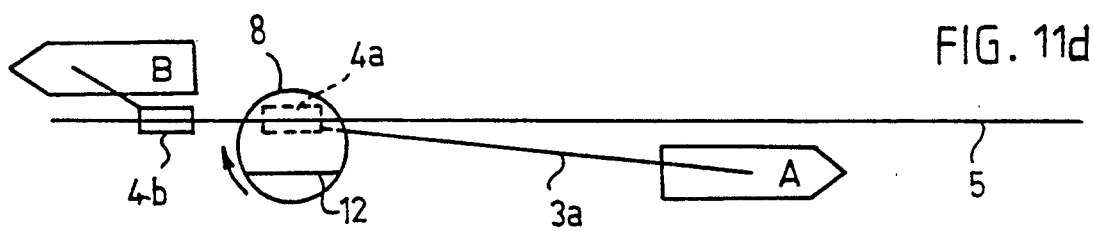
Figure 11E:
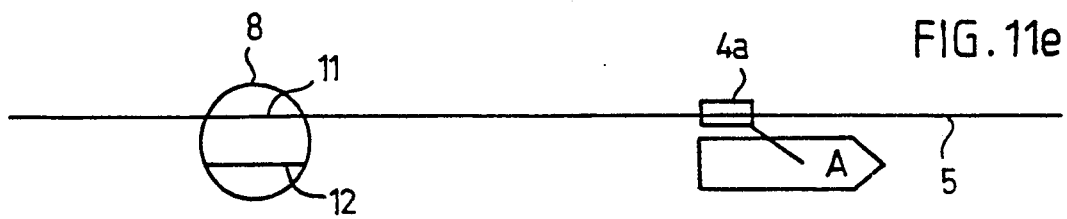

FIGS. 11a to 11e illustrate schematically the operation of the switch of the invention when used as a shunting switch. FIG. 11a shows two apparatuses A and B, to the electric cables 3a and 3b of which trolleys 4a and 4b are connected. The apparatus A approaches the switch 8 comprising the coupling portions 11 and 12 forming part of the turntable 10. When the apparatus A reaches the switch 8, as shown in FIG. 11b, the trolley 4a stops at the switch 8 and the turntable 10 of the switch is turned through 180° in the direction indicated by the arrow, for instance, so that the coupling portions 11 and 12 change places. The apparatus drives on, and, as shown in FIG. 11c, the electric cable 3a of the apparatus A is unwound from the cable reel of the apparatus while the trolley 4a remains in position within the coupling portion 11 and the apparatus B approaches the switch 8. The apparatus B is able to drive straight through the switch, so that its trolley 4b passes via the coupling portion 12 of the switch 8 onwards along the trolley track 5. After the trolley 4b of the apparatus B has passed by the switch 8, the switch is again turned in the opposite direction, so that the coupling portions 11 and 12 of the turntable of the switch 8 again change their position and the trolley 4a of the apparatus A is positioned at the trolley track 5, as shown in FIG. 11d. The trolley 4a is then released and the winding means of the cable reel of the apparatus A winds up the electric cable 3a so that the trolley 4a will again be positioned in its normal position shown in FIG. 11e. In mining conditions, when there is little space available, and it is not economical to excavate tunnels allowing uninterrupted drive, the apparatuses can pass by each other in such a manner that the apparatus bound to give way stops at the shunting place shown in connection with FIG. 2 while the other apparatus is allowed to pass by. In other respects, the operation and details of the switch are similar.

Figure 12A:
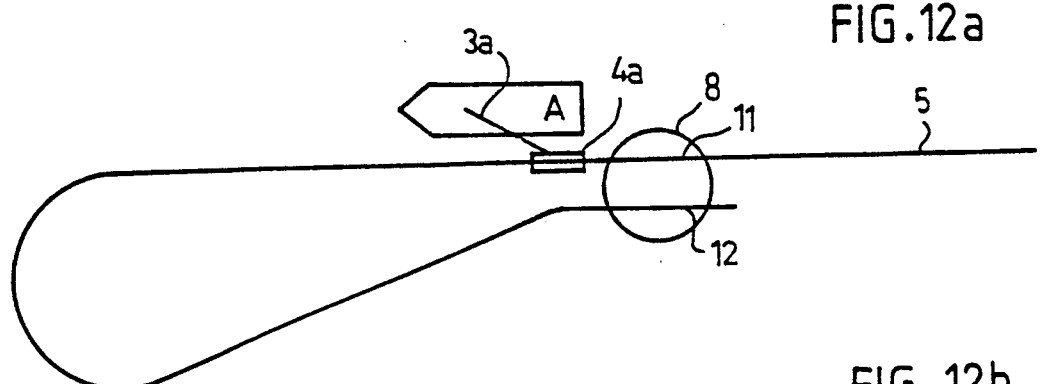
FIGS. 12a to 12d illustrates schematically the operation of the switch of the invention in forming an end loop for the trolley track.
Figure 12B:
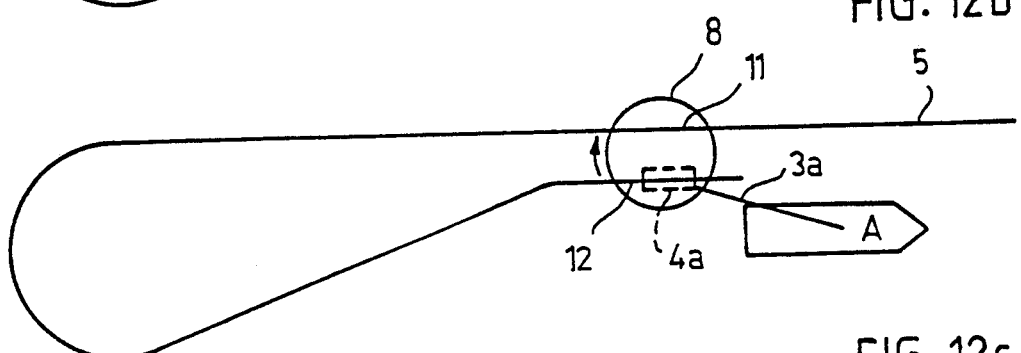
Figure 12C:
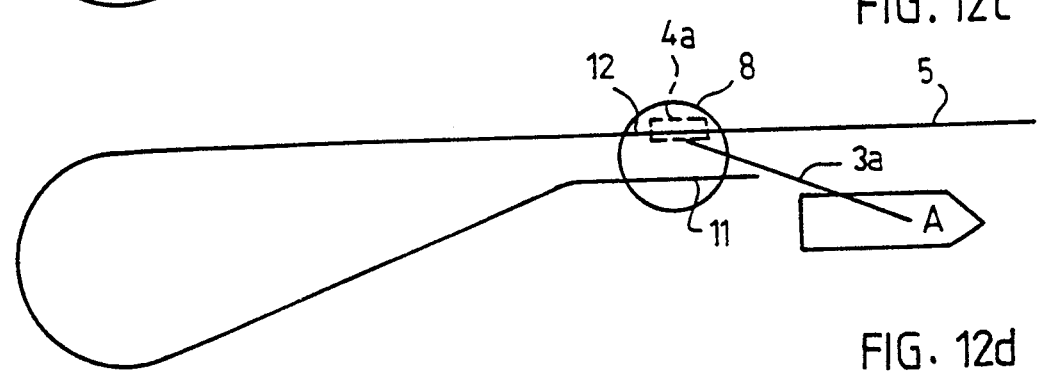
Figure 12D:
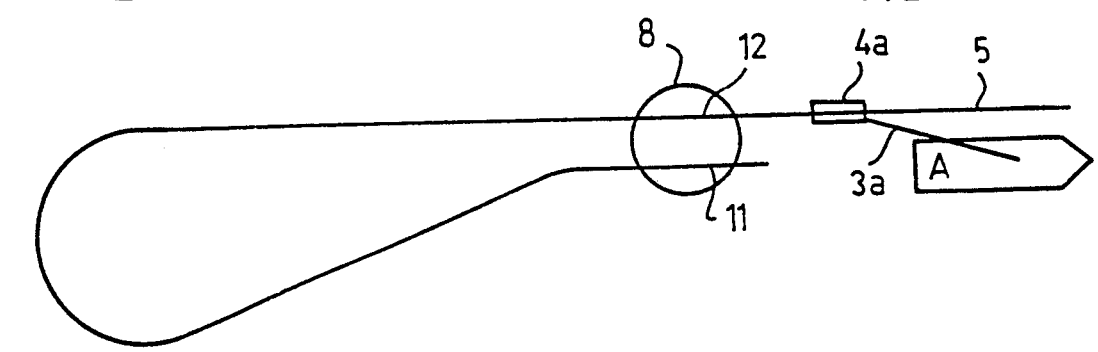

FIGS. 12a to 12d illustrate the use of the switch of the invention when a turning loop is formed at the end of the trolley track, along which loop the trolley 4 moves when the apparatus turns around at the end of the track. FIG. 12a shows an apparatus A to which a trolley 4a is connected by an electric cable 3a. In the case of FIG. 12a, the apparatus A has passed by the switch 8 and moves on within the loop portion of the trolley track 5, whereby the coupling portion 11 of the switch 8 connects the trolley track and the loop portion, and the coupling portion 12 forms an extension of the end of the loop. After the apparatus A has moved around the loop, its trolley 4a reaches the coupling portion 12 of the switch 8 and stops therein, as shown in FIG. 12b, while the cable winding equipment of the apparatus A allows the cable 3a to be extended, and the apparatus A can move on without interruption. In FIG. 12b, the turntable of the switch 8 is pivoted through 180°, e.g. in the direction shown by the arrow, so that the coupling portions 12 and 11 change places, as shown in FIG. 12c. At the same time the trolley 4a moves from the position within the extension of the loop end to the trolley track 5, as shown in FIG. 12c. Since the position of the phase and zero rails, i.e. busbars of the coupling portions 11 and 12 of the switch 8 is reversely symmetrical with respect to the turning axis of the switch, the trolley 4a also turns and is positioned in the right position with respect to the voltage phases of the trolley track 5, as a result of which the power supply and the movement of the apparatus A continues without disturbance. When the trolley 4a reaches the trolley track 5, it is again able to move along the track 5 whilst the cable winding means of the apparatus A winds the cable 3a shorter, and the trolley 4a moves closer to the apparatus A, as shown in FIG. 12d.

FIGS. 13a and 13c show an arrangement in which another parallel trolley track 5a is provided beside the main trolley track 5, and a switch 8a and 8b of the invention is provided between the tracks at both ends, respectively. In this way several apparatuses, such as dumpers, can move along the same route between two loading places, for instance. In this arrangement, the apparatus A connected to the main trolley track 5 moves along the track 5 through the switch 8a and further up to the switch 8b and even beyond it, if necessary. After its load has been emptied or it has performed some other task, the apparatus turns around and starts to move in the opposite direction, similarly as the apparatus B in FIG. 13a, so that the trolley 4b moving on the trolley track 5 returns with it up to the switch 8b on the side of the trolley track 5, as shown in FIG. 13b. At this stage the trolley 4b stops and the turntable of the switch 8b is revolved through 180°, e.g. in the direction indicated by the arrow in such a way that the trolley 4b will be positioned at the auxiliary trolley track 5a leading in the opposite direction and having a reversed phase sequence as compared with the trolley track 5. The movement of the trolley 4b is then released so that it is able to move along the auxiliary trolley track 5a. Correspondingly, after the apparatus has reached the switch 8a, the trolley 4b stops on the side of the auxiliary trolley track 5a and when the trolley track 5 is free, the switch 8a is turned through 180°, so that the trolley 4b is again shunted to the main trolley track 5, thus allowing the apparatus move therewith. At the same time the apparatus A may move along the main trolley track 5 past the switch 8a and the switch 8b and return similarly as the apparatus B. When the arrangement is sufficiently long, several apparatuses can move along the same route without disturbing each other.

At junctions, the operation of the switch 8 is similar to that shown in the shunting and turning loop arrangements shown in FIGS. 11 to 13 except that the turntable of the switch 8 is turned only through 90° in order that the trolley would be positioned at the intersecting trolley track 7 so that it is able to move from the switch 8 to the intersecting trolley track when the apparatus turns at the junction to another track. Above in connection with FIG. 8, the remote control can be used not only at junctions but also on approaching junctions to indicate whether the apparatus is bound to give way or has priority. This depends on the rules applied but it is typical that an empty apparatus is bound to give way while a loaded apparatus has priority. The control unit 113 of the switch 8 can be supplied with necessary information by means of the remote control, e.g. a radio transmitter or some other device known per se, so that the unit can prepare for appropriate operation. The passing can, of course, take place as described above but the driver can indicate in advance in which direction he is going to turn. After the trolley has stopped at the switch, the apparatus turns it to a trolley track 5 of a desired direction and allows it to move in this direction without that the driver needs to do anything else. The control can, of course, also be realized by providing control buttons at the junctions, whereby the driver has to get off the apparatus to turn the switch in a desired direction. The approach switches 114a and 114b shown in connection with FIG. 9a can be installed in all trolley track directions for indicating that an apparatus is approaching the switch and, correspondingly, that an apparatus is leaving the switch in some direction. Two or more switches can thereby be interconnected in such a manner that their control units 113 indicate the apparatus approaching the following switch and possibly also whether it is bound to give way or not.

The invention has been described above and shown in the drawings by way of example and it is in no way restricted to this example. The structural details, operating means and control of the switch in each particular case can be realized in various ways, and the tubular roller races can be replaced with any other conventional rail structures. Similarly, the wheels of the trolley track can be realized in various ways.

I claim:
1. Power supply means for electrically operated moving apparatuses comprising:
   a trolley track comprising bus bars positioned at least over a portion of the length of the trolley track and above a space where the apparatuses move;
   trolleys movable on the trolley track, the trolleys comprising contacts arranged in contact with the bus bars, each trolley being connected to a respective apparatus by an electric cable;
   a first turntable-type switch, rotatable about a turning axis, installed in the trolley track above the space where the apparatuses move and comprising a first coupling portion forming part of the trolley track whereby, when said first coupling portion extends in the same direction as the trolley track and in alignment with the trolley track, the first coupling portion forms, together with the trolley track, a continuous trolley track along which a trolley is movable, said first coupling portion being pivotable about the turning axis away from the trolley track to another position, whereby the trolley is turnable with the first coupling portion by means of said first switch to another position;
   said first switch also comprising a second coupling portion, parallel to said first coupling portion, positioned reversely symmetrically with respect to said turning axis of said first switch, with each of said first and second coupling portions having bus bars;

said bus bars of said first and second coupling portions having a phase sequence reversely symmetrical with respect to said turning axis;

the coupling portions being spaced from one another such that a trolley can be positioned simultaneously on both coupling portions;

both coupling portions of said first switch being turnable into alignment with said trolley track to form a continuous trolley track;

said first switch being installed in the trolley track to form a shunting switch whereby, when two apparatuses pass by each other, the trolley of a first apparatus is stopped on said first coupling portion of said first switch forming a continuous trolley track and turned together with said first coupling portion away from the trolley track while said second coupling portion is correspondingly turned to form a continuous trolley track along which the trolley of a second apparatus is able to pass by said first switch, said first switch including braking and locking means for stopping a trolley at said first switch and for locking it in position during the turning movements of the first switch.

2. Power supply means according to claim 1 wherein said first switch is installed in said trolley track near an end portion of a turning loop of said trolley track whereby said first coupling portion forms a continuation of said trolley track and said second coupling portion forms an extension of the end portion of said turning loop, and the trolley of said first apparatus after passing off of the end portion of said turning loop becomes located on said second coupling portion of said first switch and is then returnable to said trolley track by turning said first switch such that said second coupling portion turns to form a continuation of the trolley track and said first coupling portion turns to form an extension of the end portion of the turning loop.

3. Power supply means according to claim 1 including a second switch installed on said trolley track, a shunting track being installed beside the trolley track between said first and second switches so as to form a shunting loop on the trolley track, the trolley track being positioned reversely symmetrical with respect to the shunting track whereby the trolleys are able to move on the trolley track and the shunting tract between the switches.

4. Power supply means according to claim 1 wherein said braking and locking means comprise at least two braking cylinders displaceable into and away from a path of movement of said trolley, said braking cylinders each having a piston rod and each being installed such that their piston rods are extensible from said braking cylinders in respective opposite directions, said braking and locking means including control means for controlling the braking cylinders and their piston rods such that when a trolley to be stopped reaches said first switch, the piston rod of a braking cylinder directed towards a direction of arrival of the trolley is in the extended position so that the trolley strikes the piston rod of the braking cylinder, pushing it into said braking cylinder so that a flow of pressure fluid from the braking cylinder slows down the trolley and stops the trolley at said first switch.

5. A turntable-type switch for a power supply means for electrically operated moving apparatuses, the switch comprising:

a trolley track comprising bus bars positioned at least over a portion of the length of the trolley track above a space where the apparatuses move;

trolleys movable on the trolley track, the trolleys comprising contacts arranged in contact with the bus bars, each trolley being connected to a respective apparatus by an electric cable;

said switch comprising a first coupling portion forming part of the trolley track whereby, when said first coupling portion extends in the same direction as the trolley track and in alignment with it, the first coupling portion forms together with the trolley track a continuous trolley track along which a trolley is movable, said first coupling portion being pivotable about a turning axis of said switch away from the trolley track to another position, whereby the trolley is turnable with the first coupling portion by means of the switch to another position when the trolley reaches the switch;

said switch also comprising a second coupling portion, parallel to said first coupling portion, positioned reversely symmetrically with respect to said turning axis of said switch, with each of said first and second coupling portions having bus bars;

said bus bars of said first and second coupling portions having a phase sequence reversely symmetrical with respect to said turning axis;

the coupling portions being spaced from one another such that a trolley can be positioned simultaneously on both coupling portions;

both coupling portions of said switch being turnable into alignment with said trolley track to form a continuous trolley track, and said switch including braking and locking means for stopping the trolley at said switch and for locking said trolley in position during turning movements of said switch.

6. A switch according to claim 5 wherein said braking and locking means comprise at least two braking cylinders displaceable into and away from a path of movement of said trolley, said braking cylinders each having a piston rod and each being installed such that their piston rods are extensible from said braking cylinders in respective opposite directions, said braking and locking means including control means for controlling the braking cylinders and their piston rods such that when a trolley to be stopped reaches said switch, the piston rod of a braking cylinder directed towards a direction of arrival of the trolley is in the extended position so that the trolley strikes the piston rod of the braking cylinder, pushing it into said braking cylinder so that a flow of pressure fluid from the braking cylinder slows down the trolley and stops the trolley at said switch.

* * * * *